United States Patent
Kato et al.

(10) Patent No.: US 9,318,826 B2
(45) Date of Patent: Apr. 19, 2016

(54) CONNECTOR STRUCTURE

(71) Applicant: Yazaki Corporation, Tokyo (JP)

(72) Inventors: Hajime Kato, Kakegawa (JP); Kazuhiro Tomine, Kakegawa (JP); Takaaki Miyajima, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/440,937

(22) PCT Filed: Nov. 7, 2013

(86) PCT No.: PCT/JP2013/080098
§ 371 (c)(1),
(2) Date: May 6, 2015

(87) PCT Pub. No.: WO2014/073601
PCT Pub. Date: May 15, 2014

(65) Prior Publication Data
US 2015/0280342 A1    Oct. 1, 2015

(30) Foreign Application Priority Data
Nov. 8, 2012  (JP) .................................. 2012-246797

(51) Int. Cl.
*H01R 31/08* (2006.01)
*H01R 13/115* (2006.01)
(Continued)

(52) U.S. Cl.
CPC .............. *H01R 13/115* (2013.01); *B60L 11/14* (2013.01); *B60L 11/1803* (2013.01); *B60L 11/1877* (2013.01); *H01R 13/6273* (2013.01); *H01R 31/08* (2013.01); *B60K 2001/0416* (2013.01); *B60L 2210/40* (2013.01); *B60Y 2410/115* (2013.01); *H01R 13/639* (2013.01); *H01R 13/748* (2013.01); *Y02T 10/70* (2013.01);
(Continued)

(58) Field of Classification Search
CPC ...................................................... H01R 31/08
USPC .................. 439/512, 513, 211, 207
See application file for complete search history.

(56) References Cited

U.S. PATENT DOCUMENTS 5,611,710 A * 3/1997 Essrich .................. H01R 24/78
439/513
5,743,735 A * 4/1998 Vollstedt .............. A61C 17/043
433/91

(Continued)

FOREIGN PATENT DOCUMENTS

JP    2002-270294 A    9/2002
JP    2003-203722 A    7/2003
JP    2012-79413 A    4/2012

OTHER PUBLICATIONS

Communication issued on May 12, 2015 by the International Searching Authority in related Application No. PCT/JP2013/080098, (PCT/IB/373 & PCT/ISA/237).

(Continued)

*Primary Examiner* — Phuong Dinh
(74) *Attorney, Agent, or Firm* — Sughrue Mion, PLLC

(57) ABSTRACT

As a connector structure of the invention, there is provided a connector structure in which a pair of connectors are assembled to an opening (11) which penetrates a floor panel (1) in a passenger compartment from both sides of the floor panel (1) and terminal portions which are provided individually in the connectors which are fitted together are electrically connected.

2 Claims, 9 Drawing Sheets

(51) Int. Cl.
*H01R 13/627* (2006.01)
*B60L 11/14* (2006.01)
*B60L 11/18* (2006.01)
H01R 13/639 (2006.01)
H01R 13/74 (2006.01)
B60K 1/04 (2006.01)

(52) U.S. Cl.
CPC ............ *Y02T10/7005* (2013.01); *Y02T 10/705* (2013.01); *Y02T 10/7077* (2013.01); *Y02T 10/7241* (2013.01)

(56) References Cited

U.S. PATENT DOCUMENTS

| | | | | |
|---|---|---|---|---|
| 8,231,359 B2* | 7/2012 | Merz | ...................... | F04B 23/106 |
| | | | | 417/205 |
| 8,333,610 B2* | 12/2012 | Osada | .................... | H01M 2/266 |
| | | | | 439/513 |
| 8,951,065 B2* | 2/2015 | Tsuge | .................. | H01R 13/631 |
| | | | | 439/559 |
| 2005/0048843 A1 | 3/2005 | Iida | | |
| 2012/0244746 A1 | 9/2012 | Tsuge et al. | | |

OTHER PUBLICATIONS

Written Opinion dated Jan. 7, 2014 issued by the International Searching Authority in counterpart International Patent Application No. PCT/JP2013/080098 (PCT/ISA/237).

Search Report dated Jan. 7, 2014 issued by the International Searching Authority in counterpart International Patent Application No. PCT/JP2013/080098 (PCT/ISA/210).

\* cited by examiner

CONNECTOR STRUCTURE

TECHNICAL FIELD

The present invention relates to a connector structure for use with an electric wire which connects together electric components mounted in a vehicle such as a motor vehicle or the like and more particularly to a connector structure which runs through holes penetrating a floor panel to connect an electric motor and a power supply unit together.

BACKGROUND ART

A vehicle such as an electric vehicle which is driven by using an electric motor or a hybrid electric vehicle which is driven by using an engine and an electric motor in parallel, is driven by supplying electric power from a power supply unit mounted in the vehicle to an electric motor. For example, in a hybrid electric vehicle, an engine, an electric motor, an inverter and the like are mounted in an engine compartment, while a power supply unit (a battery unit) which supplies electric power to the electric motor, an electrical joint box (a junction box) and the like are mounted in a passenger compartment. The electric motor and the inverter are connected together by a conductor cable such as a motor cable, and the inverter and the power supply unit are connected together by a conductor wire such as a wire harness (refer to Patent Literature 1). The wire harness is routed under (a road surface side of) a floor panel which makes up a bottom portion of the passenger compartment and is drawn into the passenger compartment via a through hole formed in the floor panel. Then, a connector provided at a passenger compartment side end portion of the wire harness and a connector connected to an electrical joint box which is disposed adjacent to the power supply unit are fitted together, whereby the electric motor and the power supply unit can electrically be connected to each other.

In the case of the connecting form described above, the electric motor and the power supply unit need to be electrical connected via the wire harness which runs through the through holes in the floor panel. In this connecting form, the connecting procedure and the control of the connecting work tend to become complex and troublesome, and various countermeasures have conventionally been taken to cope therewith. In the connector structure disclosed in Patent Literature 1, in order to absorb an assembling error between the wire harness side connector and the electrical joint box side connector, specifically, a positional deviation between connection terminals in both the connectors, a space is formed in a terminal accommodating compartment of the electric joint box side connector so that the connection terminals therein can move within a predetermined range, whereby the connection terminals in the terminal accommodating compartment can move to follow the connection terminals positioned in the wire harness side connector. Doing this obviates the necessity of electrical connection work of adjusting the routing of the wire harness drawn into the passenger compartment through the through hole within the passenger compartment. In this way, the problematic complexity and troublesomeness involved in the connecting procedure and the control of the connecting work are attempted to be solved.

PRIOR ART LITERATURE

Patent Literature

Patent Literature 1: JP-A-2012-79413

SUMMARY OF THE INVENTION

Problem that the Invention is to Solve

Incidentally, in the connector structure disclosed in Patent Literature 1, a high-voltage circuit is formed between the electric motor and the power supply unit. Consequently, in order to ensure the safety of a working person in providing a mechanical inspection or maintenance of a vehicle or performing rescue work, it is necessary to provide separately a service plug (a circuit opening/closing device) in the electrical joint box or the power supply unit. With this service plug, the high-voltage circuit is opened to shut off the circuit current, and thereafter, the opened circuit is closed again to cause the circuit current to flow through the circuit.

The invention has been made in view of the situations described above, and a problem that the invention is to solve is how to realize an improvement in efficiency and safety of electrical connection work for pieces of electrical equipment via a through hole opened in a floor panel, while realizing a reduction in the number of parts involved.

Means for Solving the Problem

With a view to solving the problem, according to an aspect of the invention, there is provided a connector structure in which a pair of connectors are assembled to an opening which penetrates a floor panel in a passenger compartment from both sides of the floor panel, and terminal portions which are provided individually in the connectors which are fitted together are electrically connected, the connector structure comprising: a first connector including a first terminal portion which is led through the opening in the floor panel to project into the passenger compartment; a second connector including a second terminal portion which is positioned opposite to the first terminal portion in a state that the second connector is fitted to the first connector across the floor panel, and an opening portion through which the first terminal portion and the second terminal portion are exposed to an exterior; and a contact member which is detachably installed in the opening portion to be brought into contact with the first terminal portion and the second terminal portion for establishing an electric connection between the first terminal portion and the second terminal portion.

According to this connector structure, an electric conducting state can easily be provided between the first terminal portion and the second terminal portion by fitting the first connector and the second connector together and installing the contact member in the opening portion. As a result of this, it is possible to realize an improvement in efficiency of the connection work of electrically connecting the first terminal portion and the second terminal portion via the opening in the floor panel. Additionally, the electric conducting state provided between the first terminal portion and the second terminal portion can be shut off by pulling (removing) the contact member out of (from) the opening portion. Namely, the contact member can function as a so-called service plug (a circuit opening/closing device). This obviates the necessity of providing a service plug separately in an electrical joint box or a power supply unit, thereby making it possible to realize a reduction in the number of parts involved.

Additionally, as another mode of the invention, the contact member includes a first flexible arm portion which is brought into contact with the first terminal portion and a second flexible arm portion which is brought into contact with the second terminal portion, and the first flexible arm portion and the second flexible arm portion, which are elastically deflected to be deformed, hold the first terminal portion and the second terminal portion therebetween.

Advantage of the Invention

According to the invention, it is possible to realize an improvement in efficiency and safety of electrical connection work for pieces of electrical equipment (as examples, an electric motor and a power supply unit) via the through hole opened in the floor panel, while realizing a reduction in the number of parts involved.

BRIEF DESCRIPTION OF DRAWINGS

FIGS. 1A and 1B are views showing an overall configuration of a connector structure according to an embodiment of the invention, of which FIG. 1A is an exploded perspective view of the connector structure which is disassembled to constituent members, and FIG. 1B is an overall perspective view showing a state in which the constituent members are assembled together.

FIGS. 3A and 3B are views showing the other connector (a second connector) which is another of the constituent members of the connector structure, of which FIG. 3A is a perspective view showing the other connector, and 3B is a horizontal sectional view of a portion indicated by arrows A31 in FIG. 3A as seen from a direction indicated by the arrows.

FIGS. 7A and 7B are views showing the state resulting after the first connector and the second connector are fitted together, of which FIG. 7A is a vertical sectional view showing the state resulting before the contact securing plug is fitted in the opening portion as seen from a direction indicated by an arrow A6 in FIG. 6, and FIG. 7B is an enlarged view of an encircled portion in FIG. 7A.

FIGS. 9A and 9B are views showing the state resulting after the contact securing plug is fitted in the opening portion, of which FIG. 9A is a vertical sectional view as seen from a direction indicated by an arrow A8 in FIG. 8, and FIG. 9B is an enlarged view of an encircled portion in FIG. 9A.

MODE FOR CARRYING OUT THE INVENTION

Hereinafter, referring to the accompanying drawings, a connector structure of the invention will be described. A connector structure according to the invention is such that a pair of connectors are assembled to an opening which penetrates a floor panel of a passenger compartment from both sides of the floor panel to be fitted together, so that terminal portions which are provided individually in both the connectors fitted together are electrically connected to each other. The pair of connectors make up part of an electric circuit which connects electrically pieces of electrical equipment (electric devices mounted in a vehicle such as a motor vehicle) which are connected individually to the connectors. An electric motor which is mounted in an electric vehicle or a hybrid electric vehicle and a power supply unit (a battery unit) which supplies electric power to the electric motor can be raised as examples of the electrical equipment. For example, in the case of the hybrid electric vehicle, the electric motor is mounted in an engine compartment together with an engine and an inverter, and the power supply unit is mounted at an exterior of the engine compartment (a rear portion of the vehicle, a bottom portion of the vehicle, a passenger compartment, and the like) together with an electrical joint box (a junction box). Then, a connector connected to the electric motor and a connector connected to the power supply unit are assembled to an opening which penetrates a floor panel of a passenger compartment (a sheet metal member which makes up a bottom portion of the passenger compartment) from both sides of the floor panel to be fitted together, so that terminal portions which are installed in both the connectors fitted together are electrically connected to each other.

Figure 1A:
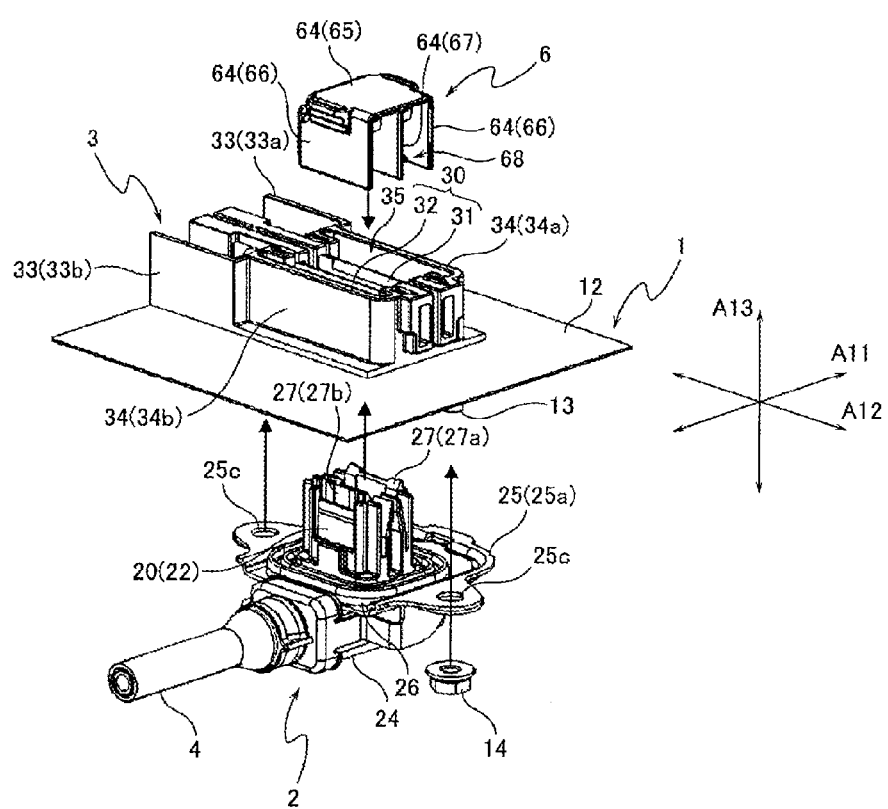
Figure 1B:
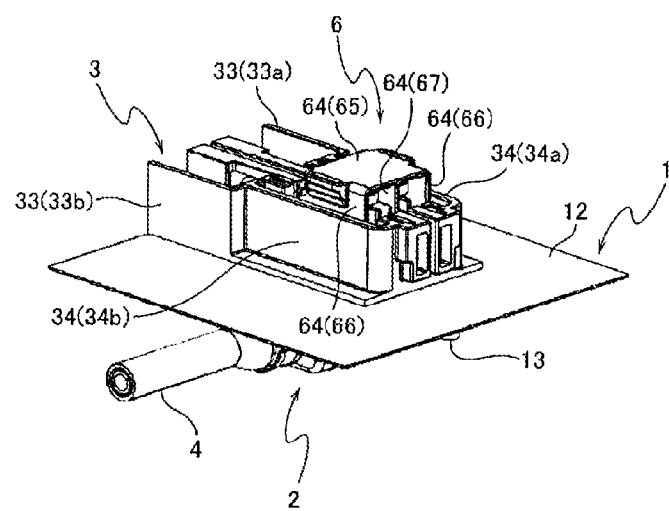
Figure 2:
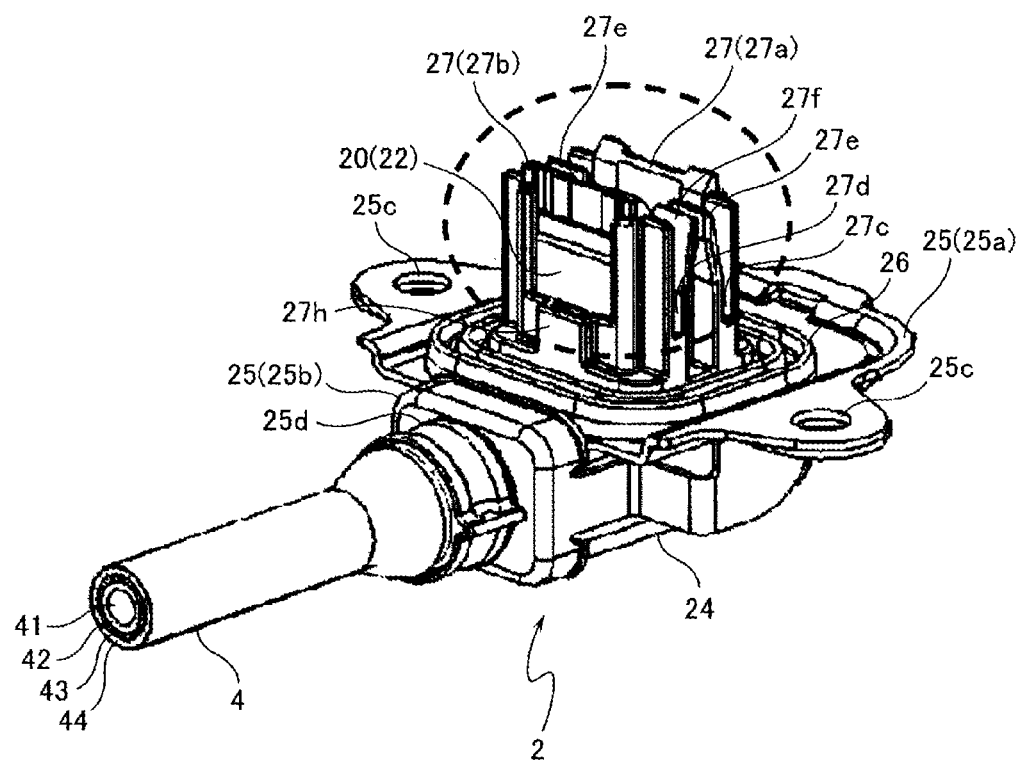
FIG. 2 is a perspective view showing one connector (a first connector) which is one of the constituent members of the connector structure.
Figure 3A:
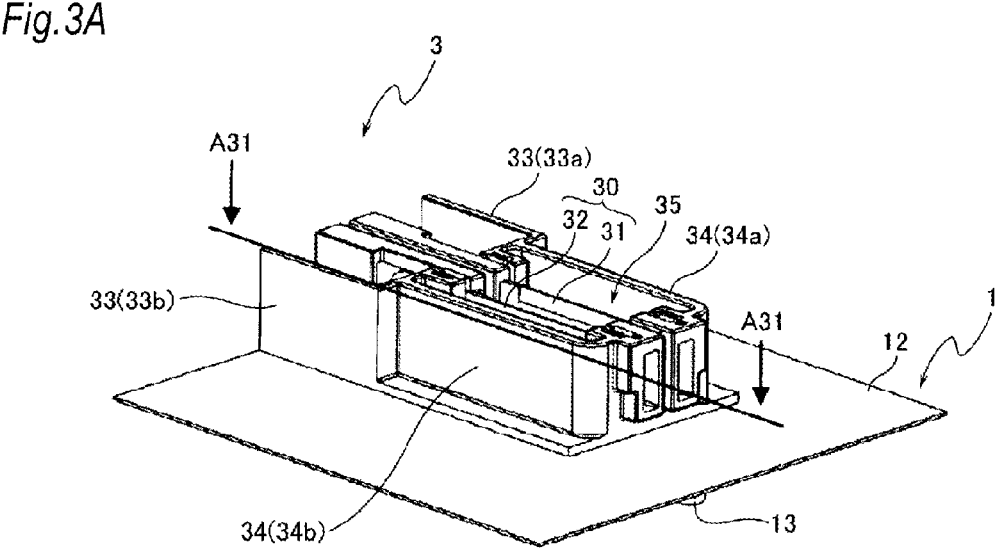
Figure 3B:
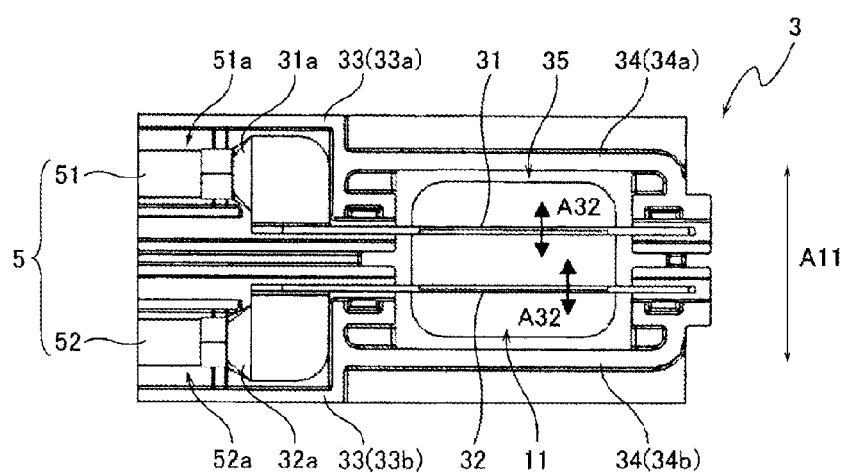

FIGS. 1A and 1B show an overall configuration of a connector structure according to an embodiment of the invention. FIGS. 1A and 1B are perspective views showing the whole of the connector structure. FIG. 1A is an exploded perspective view showing constituent members of the connector structure which are disassembled, and FIG. 2B is an overall perspective view showing a state in which the constituent members shown in FIG. 1 are assembled together. FIG. 2 is a perspective view showing one connector (a first connector) which is one of the constituent members of the connector structure. FIGS. 3A and 3B are views showing the other connector (a second connector) which is another of the constituent members of the connector structure, of which FIG. 3A is a perspective view showing the other connector, and FIG. 3B is a horizontal sectional view of a portion indicated by arrows A31 in FIG. 3A as seen from a direction indicated by the arrows. In the following description, a direction indicated by an arrow A11 in FIG. 1A will be referred to as a front-to-rear direction, a direction indicated by an arrow A12 in the same figure will be referred to as a left-to-right direction, and a direction indicated by an arrow A13 in the same figure will be referred to as a top-to-bottom direction. In the front-to-rear direction and the left-to-right direction, a side which lies closer to the center of an opening in the floor panel will be referred to as an inner side, and a side which lies farther away from the center of the opening will be referred to as an outer side. In the top-to-bottom direction, unless otherwise described, an upper side of each figure (corresponding to a passenger compartment side) will be referred to as an upper side, and a lower side thereof (corresponding to a road surface side) will be referred to as a lower side. However, these front-to-rear direction, left-to-right direction and top-to-bottom direction may not necessarily coincide with the corresponding directions in such a state that the connector structure is actually mounted on the vehicle (for example, a front-to-rear or longitudinal direction, a left-to-right or transverse direction and a top-to-bottom or vertical direction of the vehicle).

Figure 4:
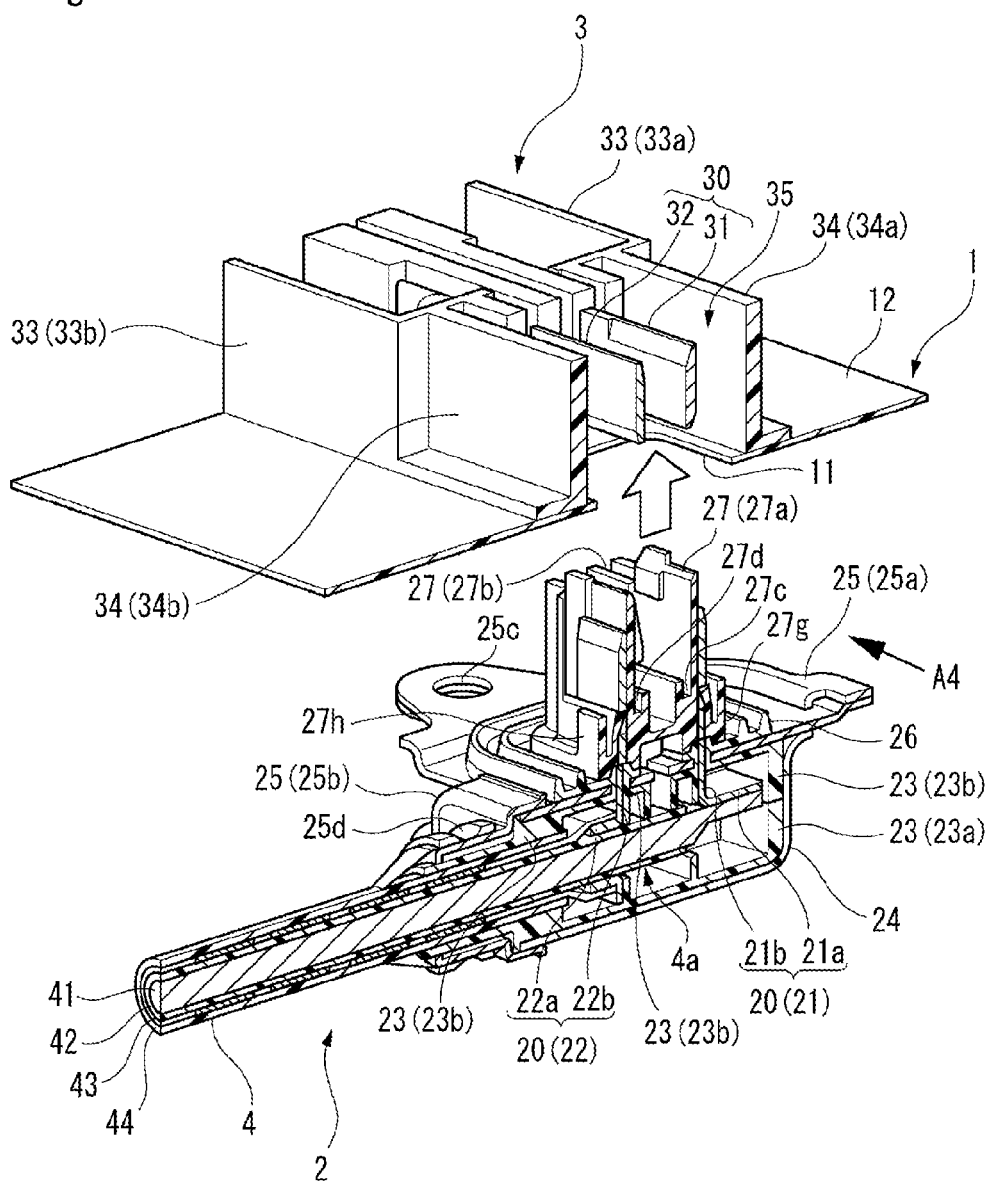
FIG. 4 is a perspective view, partially vertically sectioned in relation to a front-to-rear direction, showing the state resulting before the first connector and the second connector are fitted together.
Figure 5:
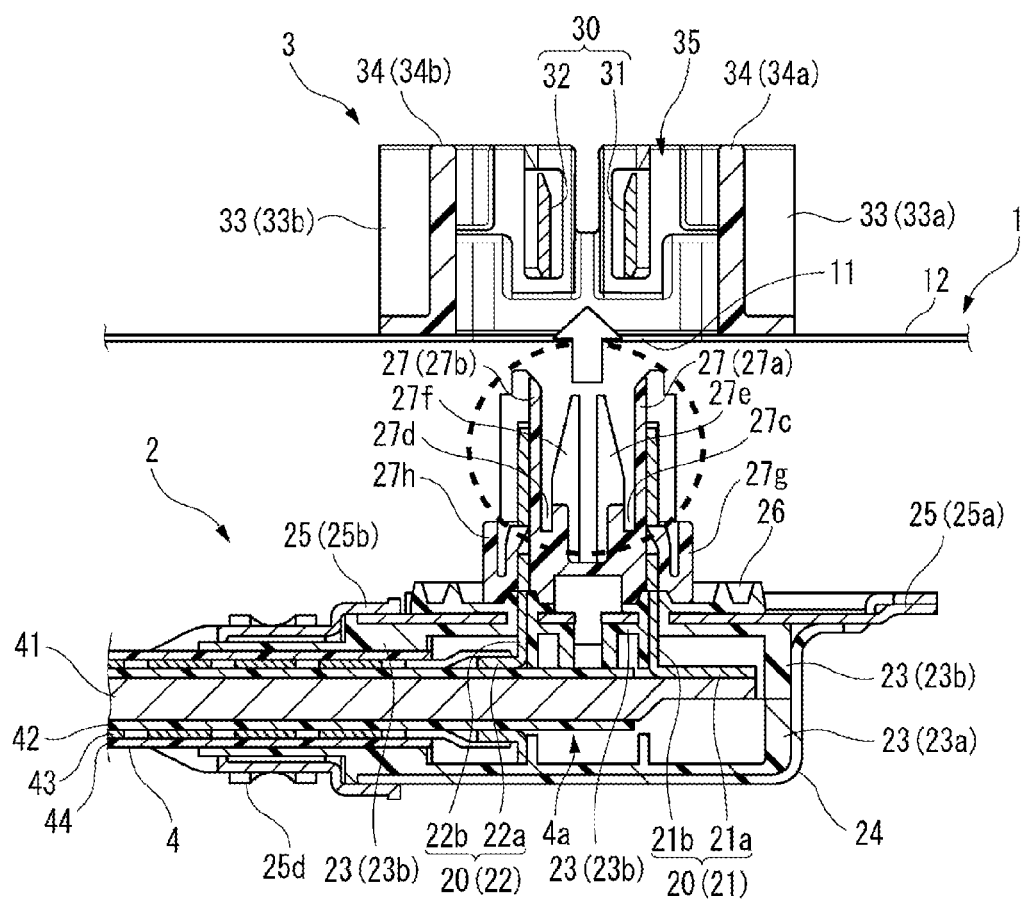
FIG. 5 is a vertical sectional view showing the state resulting before the first connector and the second connector are fitted together from a direction indicated by an arrow A4 in FIG. 4.

The connector structure of this embodiment includes a first connector 2 which includes, in turn, a first terminal portion 20 which is led through an opening 11 (refer to FIG. 4) in a floor panel 1 to project into a passenger compartment (corresponding to the upper side in the top-to-bottom direction in FIGS. 1A and 1B) and a second connector 3 which includes, in turn, a second terminal portion 30 which is positioned so as to face the first terminal portion 20 in such a state that the second connector 3 is fitted to the first connector 2 while holding the floor pane 1 therebetween. A flat portion (hereinafter, referred to as a connector assembling portion) which extends parallel to a plane defined by the front-to-rear direction and the left-to-right direction is provided on the floor panel 1. Then, the opening (in other words, a through hole) 11 is formed so as to penetrate the connector assembling portion 12 in the top-to-bottom direction. As shown in FIGS. 4 and 5, the first connector 2 which is positioned on a lower side (a road surface side) and the second connector 3 which is positioned on an upper side (a passenger compartment side) of the connector assembling portion 12 in relation to the top-to-bottom direction are positioned so that they assembled together in the top-to-bottom direction at the opening 11 so as to be fitted together, whereby the first terminal portion 20 and the second terminal portion 30 are connected to each other to establish a conducting state. FIG. 4 is a perspective vie partially vertically sectioned in relation to the front-to-rear direction, showing the state resulting before the first connector 2 and the second connector 3 are fitted together. Additionally, FIG. 5 is a vertical sectional view showing the state resulting before the first connector 2 and the second connector 3 are fitted together from a direction indicated by an arrow A4 in FIG. 4.

The first connector 2 is provided at a distal end side (hereinafter, referred to as an end portion) 4a of a conductor wire (hereinafter, referred to as an underfloor conductor wire) 4 which is routed substantially parallel along the connector assembling portion 12 on a lower side (a road surface side) of the floor panel 1 in relation to the top-to-bottom direction. A proximal end side (an opposite side to the end portion 4a) of the underfloor conductor wire 4 is connected to an inverter (not shown), and the inverter is connected to an electric motor (not shown) via a conductor wire (hereinafter, referred to as a motor cable) which is routed within an engine compartment, not shown. This allows the first connector 2 to be connected to the electric motor via the underfloor conductor wire 4, the inverter and the motor cable sequentially in that order. The underfloor conductor wire 4 is let out of the engine compartment and is routed on the lower side of the floor panel 1 between the floor panel 1 and a road surface, and therefore, the underfloor conductor wire 4 is constructed to reduce its thickness or height so as to ensure a certain distance from the road surface. Additionally, the underfloor conductor wire 4 is configured as a so-called coaxial electric wire which includes an inner conductor 41 which is covered by an inner insulator 42 and an outer conductor 43 which surrounds an outer circumference of the inner insulator 42 and which is covered by an outer insulator 44 concentrically with the inner conductor 41. The inner conductor 42 and the outer conductor 43 can take an arbitrary form. For example, it can be assumed that the inner conductor 41 is made up of a twisted wire and the outer conductor 43 is made up of a braided wire or a foil. Additionally, the inner insulator 42 and the outer insulator 44 may be made of an insulation material (for example, a resin material such as polyethylene, vinyl chloride, silicon or the like).

In this embodiment, the first connector 2 includes the first terminal portion 20, a first holding portion 23, a first connector housing 24, a shielding shell 25, a seal member 26, and a connector fitting portion 27.

The first terminal portion 20 includes two first terminal constituent members 21, 22 which are paired with each other, and the first terminal constituent members 21, 22 have, respectively, first terminal proximal end portions 21a, 22a which are connected to the end portion 4a of the underfloor conductor wire 4 and first terminal distal end portions 21b, 22b which project from the opening 11 in the floor panel 1 into the passenger compartment. The first terminal proximal end portion 21a of the first terminal constituent member 21 extends into a flat plate-like shape along the end portion 4a of the underfloor conductor wire 4 and is joined to an outer circumferential portion of the inner conductor 41 from which the outer insulator 44, the outer conductor 43 and the inner insulator 42 are stripped off at the end portion 4a for electrical connection with the inner conductor 41. Additionally, the first terminal distal end portion 21b of the first terminal constituent member 21 continues to an end portion of the first terminal proximal end portion 21a and is bent from the end portion substantially perpendicularly to the upper side (the passenger compartment side) in the top-to-bottom direction to extend into a flat plate-like shape. In contrast with this, the first terminal proximal end portion 22a of the other first terminal constituent member 22 extends into a tubular shape along the end portion 4a of the underfloor conductor wire 4 and is joined to an outer circumferential portion of the outer conductor 43 from which only the outer insulator 44 is stripped off at the end portion 4a for electrical connection with the outer conductor 43. Additionally, the first terminal distal end portion 22b of the first terminal constituent member 22 continues to an end portion of the first terminal proximal end portion 22a and is bent from the end portion substantially perpendicularly to the upper side (the passenger compartment side) in the top-to-bottom direction to extend in a flat plate-like shape. These first terminal constituent member 21 and first terminal constituent member 22 are disposed so that their first terminal distal end portions 21b, 22b face each other and their first terminal proximal end portions 21a, 22a extend in opposite directions in the front-to-rear direction, making up the first terminal portion 20. As this occurs, the first terminal constituent member 21 and the first terminal constituent member 22 are positioned and oriented individually in such a way that the first terminal proximal end portion 21a extends from the end portion where it continues to the first terminal distal end portion 21b towards the rear (the end portion 4a of the underfloor conductor wire 4) in the front-to-rear direction and the first terminal proximal end portion 22a extends from the end portion where it continues to the first terminal distal end portion 22b towards the front (a proximal end side of the underfloor conductor wire 4) in the front-to-rear direction.

In this embodiment, the first terminal constituent members 21, 22 are configured as a bus module. For example, the first terminal constituent members 21, 22 can be made by routing a bus bar which is made by punching or bending a metallic sheet material having electric conductivity on an insulated substrate. As this occurs, the first terminal constituent members 21, 22 should be formed so that the first terminal proximal end portions 21a, 22a and the first terminal distal end portions 21b, 22b are integrated with each other. However, the first terminal proximal end portion and the first terminal distal end portion can be configured as separate elements. Additionally, the first terminal distal end portions 21b, 22b should be caused to extend from the first terminal proximal end portions 21a, 22a, respectively, so that they are substantially as tall as each other (a dimension in relation to the top-to-bottom direction).

The first holding portion 23 has an end holding portion 23a which positions and holds the end portion 4a of the underfloor conductor wire 4 relative to the first connector housing 24 and a terminal holding portion 23b which positions and holds the first terminal portion 20 (the first terminal constituent members 21, 22) relative to the end portion 4a. The end portion 4a of the underfloor conductor wire 4 and the first terminal portion 20 are positioned and held in the first connector 2 by these end holding portion 23a and terminal holding portion 23b.

The first connector housing 24 is formed of an insulation material (for example, a resin material such as polyethylene, vinyl chloride, silicon or the like) and is configured as a housing member which accommodates the end portion 4a of the underfloor conductor wire 4 and the first terminal portion 20 (the first terminal constituent members 21, 22). Specifically, the first connector housing 24 is configured so as not only to accommodate and position the end portion 4a of the underfloor conductor wire 4 which is held by the end holding portion 23a of the first holding portion 23 but also to accommodate the first terminal proximal end portions 21a, 22a of the first terminal constituent members 21, 22 which are positioned and held by the terminal holding portion 23b of the first holding portion 23 relative to the end portion 4a. The first terminal distal end portions 21b, 22b of the first terminal constituent members 21, extend further towards the upper side (the passenger compartment side) than the first connector housing 24 in the top-to-bottom direction. In this way, the first connector 2 is configured as a substantially L-shaped connector in appearance (an L-connector) as a result of the first connector housing 24 accommodating the end portion 4a of the underfloor conductor wire 4 and the first terminal portion 20 (the first terminal constituent members 21, 22).

The shielding shell 25 has a floor panel fixing portion 25a which fixes the first connector 2 to the floor panel 1 and a braided wire connecting portion 25b which connects with a braided wire at the end portion 4a of the underfloor conductor wire 4. The floor panel fixing portion 25a extends so as to surround the first terminal distal end portions 21b, 22b of the first terminal portion 20 along the plane defined by the front-to-rear direction and the left-to-right direction. In other words, the first terminal distal end portions 21b, 22b extend towards the upper side (the passenger compartment side) in the top-to-bottom direction beyond the floor fixing portion 25a. Additionally, a hole 25c is opened in the floor panel fixing portion 25a, and a fixing member to the floor panel is passed through this hole 25c. In this embodiment, a bolt 13 is provided with which the first connector 2 is fixed to the connector assembling portion 12 on the floor panel 1. Thus, the bolt 13 is passed through the hole 25c in the floor panel fixing portion 25a to be tightened by a nut 14, whereby the floor panel fixing portion 25a is fixedly fastened to the connector assembling portion 12. This enables the first connector 2 which is fitted in the second connector 3 to be assembled to the floor panel 1 (the fitting of the first connector 2 and the second connector 3 will be described later). The braided wire connecting portion 25b is formed into a stepped substantially tubular shape so that the braided wire connecting portion 25b is placed externally on the floor panel fixing portion 25a and is also placed externally on the first holding portion 23 (the end holding portion 23a and the terminal holding portion 23b). Then, a fixing ring 25d is fitted on a braided wire of the underfloor conductor wire 4 which is provided on an outer circumference of a small-diameter portion which is placed externally on the first holding portion 23, whereby the braided wire is crimped to the braided wire connecting portion 25b. By doing so, the braided wire connecting portion 25b connects the braided wire to the floor panel 1 via the floor panel fixing portion 25a so that the braided wire is grounded. In this way, the braided wire connecting portion 25b shields the underfloor conductor wire 4. The floor panel fixing portion 25a and the braided wire connecting portion 25b of the shielding shell 25 should be formed by punching or bending a metallic sheet material having electric conductivity.

The seal member 26 is configured as a member (a so-called packing) which is configured to be closely secured to a circumferential edge of the opening 11 in the floor panel 1 so as to seal the opening 11 in a fluid-tight fashion. The seal member 26 is formed of an elastic material such as elastomer. The seal member 26 is provided on a portion of the floor panel fixing portion 25a which surrounds the first terminal distal end portions 21b, 22b so as to cover a circumferential edge of the portion.

The connector fitting portion 27 is configured as a member which is passed through the opening 11 in the floor panel 1 to be fitted to the second terminal portion 30 (second terminal constituent members 31, 32) of the second connector 3, which will be described later. To describe this in another way, the connector fitting portion 27 is configured as a member which projects from the opening 11 in the floor panel 1 into the passenger compartment together with the first terminal distal end portions 21b, 22b (a floor panel penetrating member shown by a circle indicated by a broken line in FIGS. 2 and 5). The connector fitting portion 27 has a connector fitting portion constituent member 27a which is fitted to the second terminal constituent member 31 of the second terminal portion 30, which will be described later, on an outer side of the second terminal constituent member 31 and a connector fitting portion constituent member 27b which is fitted to the second terminal constituent member 32 of the second terminal portion 30, which will be described later, on an outer side of the second terminal constituent member 32. The connector fitting portion constituent member 27a is provided to rise from the first holding portion 23 (the terminal holding portion 23b) so as to project further towards the upper side (the passenger compartment side) along an inner side of the first terminal distal end portion 21b of the first terminal constituent member 21 than the first terminal distal end portion 21b. In other words, the connector fitting portion constituent member 27a is configured so that the first terminal distal end portion 21b extends on an outer side thereof. On the other hand, the connector fitting portion constituent member 27b is provided to rise from the first holding portion 23 (the terminal holding portion 23b) so as to project further towards the upper side (the passenger compartment side) along an inner side of the first terminal distal end portion 22b of the first terminal constituent member 22 than the first terminal distal end portion 22b. In other words, the connector fitting portion constituent member 27b is configured so that the first terminal distal end portion 22b extends on an outer side thereof. The connector fitting portion constituent members 27a, 27b should be provided on the first holding portion 23 (the terminal holding portion 23b) to rise therefrom so as to be substantially as tall as each other (a dimension in relation to the top-to-bottom direction).

These connector fitting portion constituent members 27a, 27b are disposed so as to stand opposite by a distance which corresponds to a distance defined between outer surfaces of the second terminal constituent member 31 and the second terminal constituent member 32, which will be described later, or, to describe this in another way, a distance defined between inner surfaces of the first terminal distal end portion 21b and the first terminal distal end portion 22b. In other words, the connector fitting portion constituent member 27a is disposed so as to be interposed between the first terminal distal end portion 21b and the second terminal constituent member 31, and the connector fitting portion constituent member 27b is disposed so as to be interposed between the first terminal distal end portion 22b and the second terminal constituent member 32.

Figure 6:
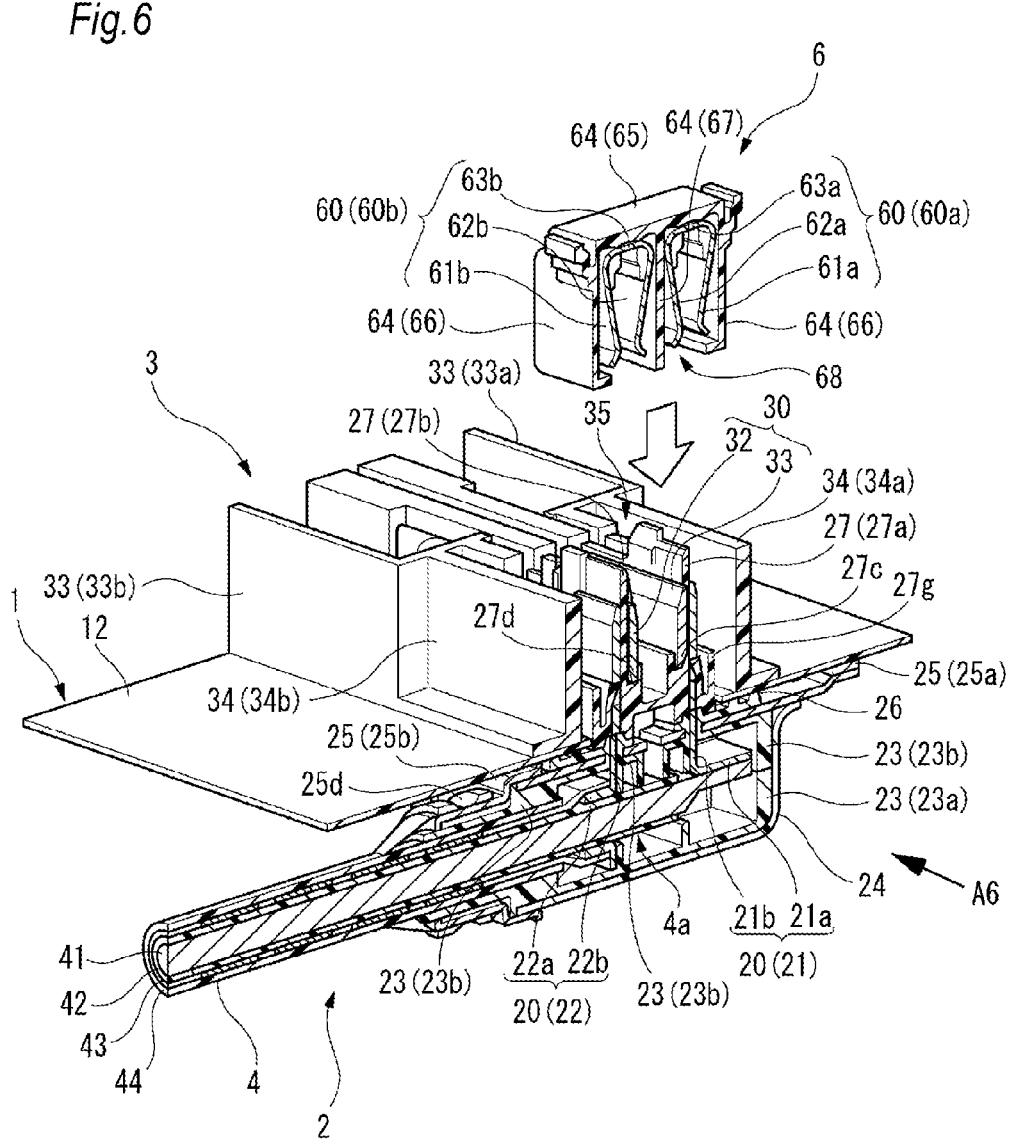
FIG. 6 is a perspective view, partially vertically sectioned in relation to the front-to-rear direction, showing a state resulting after the first connector and the second connector are fitted together but before a contact member (a contact securing plug) is fitted in an opening portion.
Figure 7A:
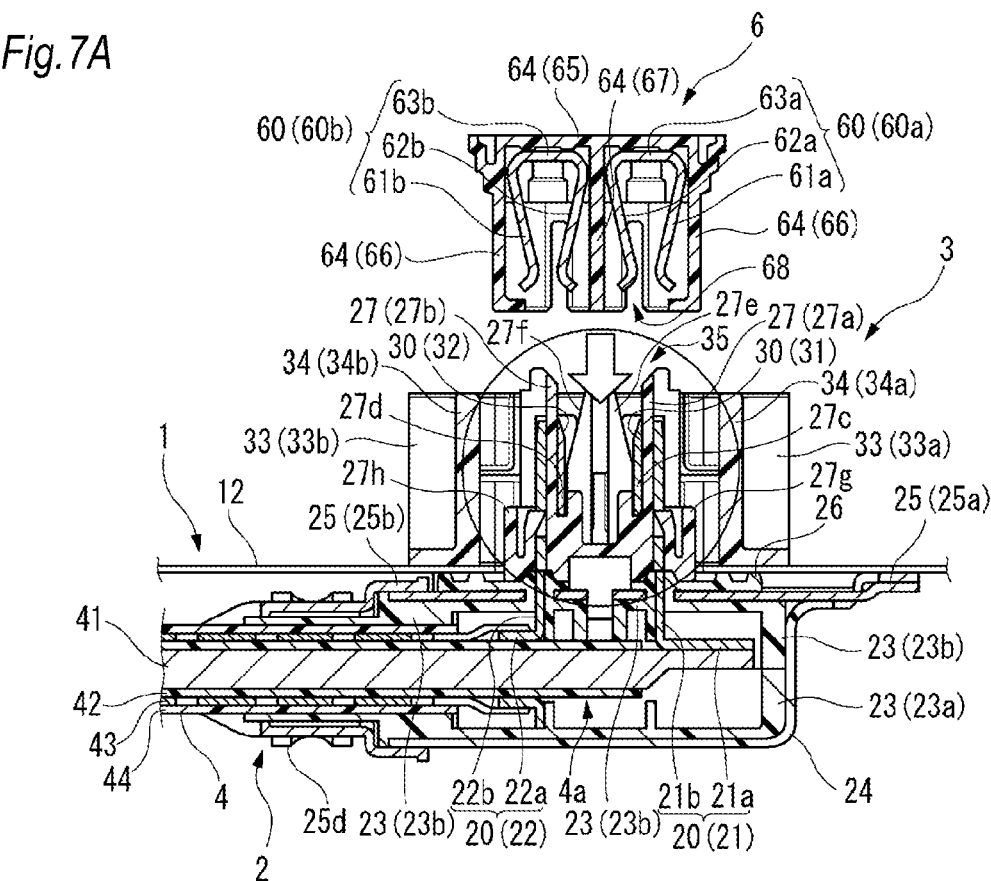
Figure 7B:
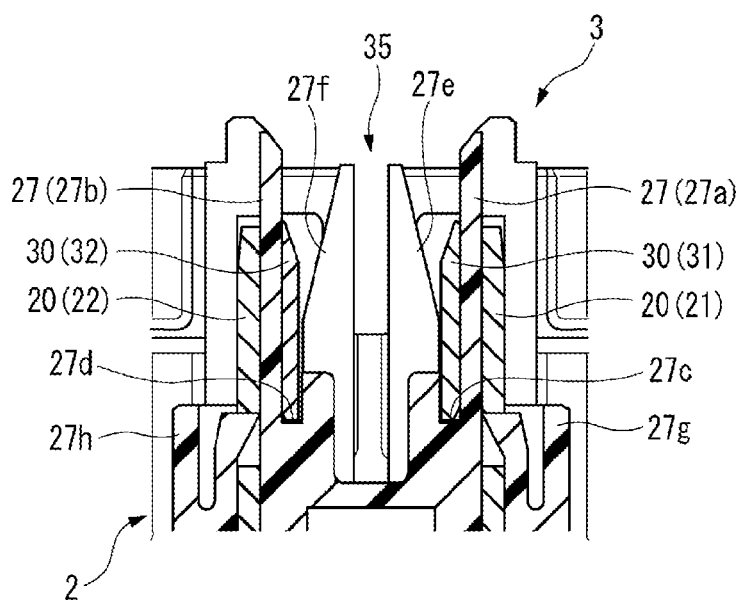

Additionally, in the connector fitting portion 27, fitting grooves 27c, 27d are formed on inner sides of proximal end portions of the connector fitting portion constituent members 27a, 27b from which the connector fitting portion constituent members 27a, 27b rise. The fitting grooves 27c, 27d have a groove width which is substantially the same as a thickness of the second terminal constituent members 31, 32 so as to allow lower end portions (lower side (road surface side) end portions in the top-to-bottom direction) of the second terminal constituent members 31, 32 to fit in the corresponding grooves 27c, 27d, respectively. Consequently, when the first connector 2 is positioned on the lower side (the road surface side) in the top-to-bottom direction of the connector assembling portion 12 so that the connector fitting portion constituent members 27a, 27b are passed through the opening 11 to project into the passenger compartment, the lower end portions of the second terminal constituent members 31, 32 of the second connector 3 which is positioned on the upper side (the passenger compartment side) can be fitted in the fitting grooves 27c, 27d, respectively. In short, the first connector 2 and the second connector 3 can be fitted together (the state shown in FIGS. 4 and 5). Then, in the state in which the first connector 2 and the second connector 3 are fitted together as shown in FIGS. 6 to 7B, the connector fitting portion constituent member 27a is interposed between the first terminal distal end portion 21b and the second terminal constituent member 31 to keep them in a non-contact condition, and the connector fitting portion constituent member 27b is interposed between the first terminal distal end portion 22b and the second terminal constituent member 32 to keep then in a non-contact condition. FIG. 6 is a perspective view, partially vertically sectioned in relation to the front-to-rear direction, showing a state resulting after the first connector 2 and the second connector 3 are fitted together but before a contact securing plug 6 (which will be described later) is fitted in an opening portion 35 (which will be described later). FIGS. 7A and 7B are views showing the state resulting after the first connector 2 and the second connector 3 are fitted together, of which FIG. 7A is a vertical sectional view showing the state resulting before the contact securing plug 6 is fitted in the opening portion 35 as seen from a direction indicated by an arrow A6 in FIG. 6, and FIG. 7B is an enlarged view of an encircled portion in FIG. 7A.

Guide members are provided in the connector fitting portion 27, and these guide members (hereinafter, referred to as second terminal constituent member pick-up portions) 27e, 27f guide the second terminal constituent members 31, 32 into the fitting grooves 27c, 27d when the second terminal constituent members 31, 32 are fitted in the fitting grooves 27c, 27d. The terminal constituent member pick-up portion 27e guides the second terminal constituent member 31 into the fitting groove 27c, and the second terminal constituent pick-up portion 27f guides the second terminal constituent member 32 into the fitting groove 27d. These second terminal constituent member pick-up portions 27e, 27f continuously extend from corresponding inner groove walls of the fitting grooves 27c, 27d towards the upper side (the passenger compartment side) in the top-to-bottom direction while facing not only each other but also the connector fitting portion constituent members 27a, 27b. In this case, these second terminal constituent member pick-up portions 27e, 27f are tapered so as to be inclined inwards as they extend towards their extending ends in such a way as to narrow a distance between tapered surfaces of the facing second terminal constituent member pick-up portions 27e, 27f. By adopting this configuration, when the first connector 2 and the second connector 3 are fitted together, the lower end portions of the second terminal constituent members 31, 32 come into abutment with tapered portion of the second terminal constituent member pick-up portions 27e, 27f, whereby the second terminal constituent members 31, 32 can be guided (caused to slid) along the tapered portions, thereby making it possible for the lower ends of the second terminal constituent members 31, 32 to fit in the corresponding fitting grooves 27c, 27d smoothly.

Further, in the connector fitting portion 27, resting seat portions 27g, 27h are provided on outer sides of the proximal end portions of the connector fitting portion constituent members 27a, 27b from which the connector fitting portion constituent members 27a, 27b rise, so that the contact securing plug 6 (specifically an outer wall portion 66 of a holder portion 64), which will be described later, is brought into abutment with the resting seat portions 27g, 27h to be supported thereon. When the contact securing plug 6 is installed in the opening portion 35 of the second connector 3, which will be described later, the outer wall portion 66 of the holder portion 64 is brought into abutment with the resting seat portions 27g, 27h, whereby the posture of the contact securing plug 6 relative to the opening portion 35 is appropriately supported.

Next, the second connector 3 will be described. The second connector 3 is provided on the upper side (the passenger compartment side) of the floor panel in relation to the top-to-bottom direction. Specifically, the second terminal 3 is provided on the connector assembling portion 12 so as to be positioned directly above the opening 11 in the floor panel 1. In this embodiment, the second connector 3 is configured as one member that the power supply unit (not shown) mounted in the passenger compartment includes or as one member that the electrical joint box of the power supply unit includes. The second connector 3 is provided at a distal end side (an end portion) of a conductor wire (hereinafter, referred to as an in-passenger compartment conductor wire) 5 which is connected to the power supply unit or the electrical joint box at a proximal end side. This allows the second connector 3 to be connected to the power supply unit or the electrical joint box via the in-passenger compartment conductor wire 5. In this case, the in-passenger compartment conductor wire 5 includes two conductor wires 51, 52 (however, the number of conductor wires is not a matter of interest). For example, the individual conductor wires 51, 52 can be configured as a high-tension electric wire which is made up of a conductor covered by an insulator. A twisted wire formed by twisting strands together can be applied to the conductor.

In this embodiment, the second connector 3 includes a second terminal portion 30 and a second connector housing 33.

The second terminal portion 30 includes the two second terminal constituent members 31, 32 which are paired with each other so that the second terminal constituent members 31, 32 correspond to the first terminal constituent members 21, 22 of first terminal portion 20, respectively. The number of first terminal constituent members that the first terminal 20 has and the number of second terminal constituent members that the second terminal portion 30 has are not limited to any specific number, as long as the numbers are the same. The second terminal constituent members 31, 32 are fixed to conductors of the two conductor wires 51, 52 from which the insulators are stripped off at end portions 51a, 52a thereof. In this embodiment, as shown in FIG. 3B, crimp portions 31a, 32a are provided on the second terminal constituent members 31, 32, respectively. The crimp portions 31a, 32a are fitted on the conductors from which the insulators are stripped off and are then crimped thereonto, whereby the second terminal constituent members 31, 32 are crimped onto the conductor wires 51, 52, respectively, for electrical connection. The second terminal constituent members 31, 32 are disposed to stand opposite by a distance which is shorter than the distance by which the first terminal constituent members 21, 22 are disposed to stand opposite. Specifically, the second terminal constituent members 31, 32 are disposed to stand opposite so that a distance defined between external surfaces of the second terminal constituent members 31, 32 standing opposite becomes substantially the same as a distance defined between inner surfaces of the connector fitting portion constituent members 27*a*, 27*b* which face each other.

The second terminal constituent member 31 is crimped to be connected to the conductor wire 51 at the crimp portion 31*a* and is bent from the crimp portion 31*a* towards the upper side (the passenger compartment side) in the top-to-bottom direction to extend into a flat plate-like shape along the first terminal distal end portion 21*b* of the first terminal constituent member 21. The second terminal constituent member 31 is configured so that the extending portion (the flat plate portion) is positioned to face the first terminal distal end portion 21*b* in such a state that the second connector 3 is fitted on the first connector 2 (that is, in such a state that the lower end portion of the second terminal constituent member 31 fits in the fitting groove 27*c* of the connector fitting portion constituent member 27*a*). In contrast with this, the other second terminal constituent member 32 is crimped to be connected to the conductor wire 52 at the crimp portion 32*a* and is bent from the crimp portion 32*a* towards the upper side (the passenger compartment side) in the top-to-bottom direction to extend into a flat plate-like shape along the first terminal distal end portion 22*b* of the first terminal constituent member 22. The other second terminal constituent member 32 is configured so that the extending portion (the flat plate portion) is positioned to face the first terminal distal end portion 22*b* in such a state that the second connector 3 is fitted on the first connector 2 (that is, in such a state that the lower end portion of the second terminal constituent member 32 fits in the fitting groove 27*d* of the connector fitting portion constituent member 27*b*).

In this embodiment, the second terminal constituent members 31, 32 are configured as a bus module. For example, the second terminal constituent members 31, 32 can be made by routing a bus bar which is made by punching or bending a metallic sheet material having electric conductivity on an insulated substrate. In order to absorb a fitting error between the first connector 2 and the second connector 3, that is, a fitting error between the lower end portions of the second terminal constituent members 31, 32 and the fitting grooves 27*c*, 27*d*, these second terminal constituent members 31, 32 are held in a holding portion 34 of the second connector housing 33 with a play (a looseness in a direction indicated by arrows A32 in FIG. 3B) which enables the second terminal constituent members 31, 32 to move to change their positions slightly in relation to the front-to-rear direction (corresponding to the top-to-bottom direction (the direction indicated by the arrow A11) in FIG. 3B) (refer to FIG. 3B).

The second connector housing 33 is formed of an insulation material (for example, a resin material such as polyethylene, vinyl chloride, silicon or the like) and is provided to rise towards the upper side (the passenger compartment side) in the top-to-bottom direction from the connector assembling portion 12 of the floor panel 1, specifically from a circumferential edge of the opening 11 and the vicinity thereof so as to cover an outer side of the second terminal portion 30 (the second terminal constituent members 31, 32). In this case, the second housing 33 has a second connector housing constituent member 33*a* which cover the second terminal constituent member 31 and a second connector housing constituent member 33*b* which covers the second terminal constituent member 32. The second connector housing constituent member 33*a* is provided to rise from the connector assembling portion 12 towards the upper sides in the top-to-bottom direction so as to cover the outer side of the second terminal constituent member 31. On the other hand, the second connector housing constituent member 33*b* is provided to rise from the connector assembling portion 12 towards the upper sides in the top-to-bottom direction so as to cover the outer side of the second terminal constituent member 32. Namely, the second connector housing constituent members 33*a*, 33*b* are configured so that the second terminal constituent members 31, 32 of the second terminal portion 30 extend therein.

The second connector housing 33 includes the holding portion 34 which positions and holds the second terminal portion 30 (the second terminal constituent members 31, 32) relative to the connector assembling portion 12 of the floor panel 1 (to describe this in another way, the opening 11). The holding portion 34 has a holding portion constituent member 34*a* which positions and holds the second terminal constituent member 31 relative to the connector assembling portion 12 and a holding portion constituent member 34*b* which positions and holds the second terminal constituent member 32 relative to the connector assembling portion 12. The holding portion constituent member 34*a* positions and holds the second terminal constituent member 31 so that the second terminal constituent member 31 faces the first terminal distal end portion 21*b* of the first terminal constituent member 21 across the connector fitting portion constituent member 27*a*. The holding portion constituent member 34*b* positions and holds the second terminal constituent member 32 so that the second terminal constituent member 32 faces the first terminal distal end portion 22*b* of the first terminal constituent member 22 across the connector fitting portion constituent member 27*a*. To describe this in another way, these holding portion constituent members 34*a*, 34*b* hold the second terminal constituent member 31 and the second terminal constituent member 32 so that they stand opposite by a distance which is shorter than a distance by which the first terminal distal end portion 21*b* and the first terminal distal end portion 22*b* stand opposite. Specifically, the holding portion constituent members 34*a*, 34*b* hold the second terminal constituent member 31 and the second terminal constituent member 32 so that they stand opposite by a distance which is substantially the same as a distance by which inner surfaces of the connector fitting portion constituent members 27*a*, 27*b* stand opposite. By adopting this configuration, the connector fitting portion constituent member 27*a* can be interposed between the second terminal constituent member 31 and the first terminal distal end portion 21*b*, and the connector fitting portion constituent member 27*b* can be interposed between the second terminal constituent member 32 and the first terminal distal end portion 22*b*. Namely, the second terminal constituent members 31, 32 can face (be kept untouched by) the first terminal distal end portions 21*b*, 22*b*, respectively, across the connector fitting portion constituent members 27*a*, 27*b* in such a state that the lower end portions of the second terminal constituent members 31, 32 fit in the engagement grooves 27*c*, 27*d*, respectively.

As shown in FIG. 3B, the holding portion constituent members 34*a*, 34*b* hold the second terminal constituent members 31, 32 at both ends in the left-to-right direction in such a way as to hold them therebetween from the front-to-rear direction. As this occurs, a distance by which the second terminal constituent members 31, 32 are held to stand opposite in the front-to-rear direction by the holding portion constituent members 34a, 34b is set to a distance corresponding to a sum of the thickness of the second terminal constituent members 31, 32 and a slight extra allowance (play). This enables the second terminal constituent members 31, 32 to change their positions in relation to the front-to-rear direction within a range of the play (to be loosened in the direction indicated by the arrows A32 in FIG. 3B) while the second terminal constituent members 31, 32 are being held by the holding member constituent members 34a, 34b. As a result of this, fitting errors between the second terminal constituent members 31, 32 and the fitting grooves 27c, 27d (for example, positional deviations of the connector fitting portion constituent members 27a, 27b of the connector fitting portion 27) can be absorbed by the plays (loosenesses) of the second terminal constituent members 31, 32. Namely, the first connector 2 and the second connector 3 can be fitted together smoothly.

Figure 8:
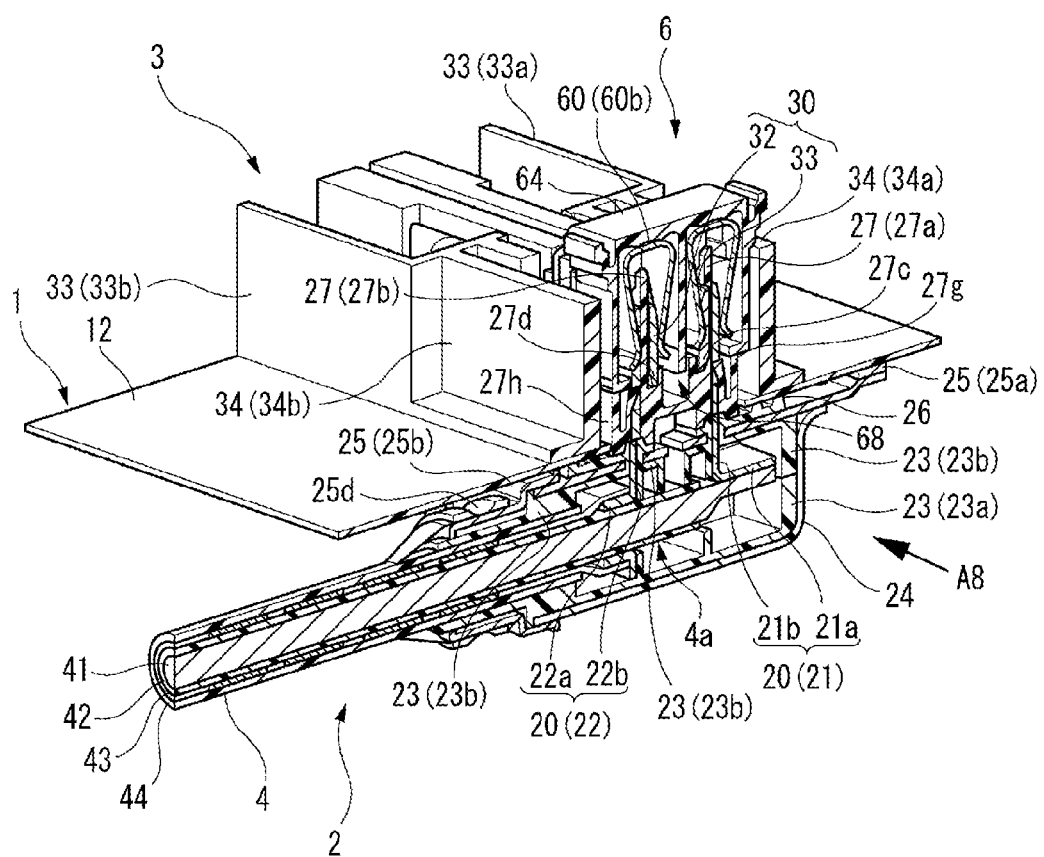
FIG. 8 is a perspective view, partially vertically sectioned along the front-to-rear direction, showing a state resulting after the contact securing plug is fitted in the opening portion.
Figure 9A:
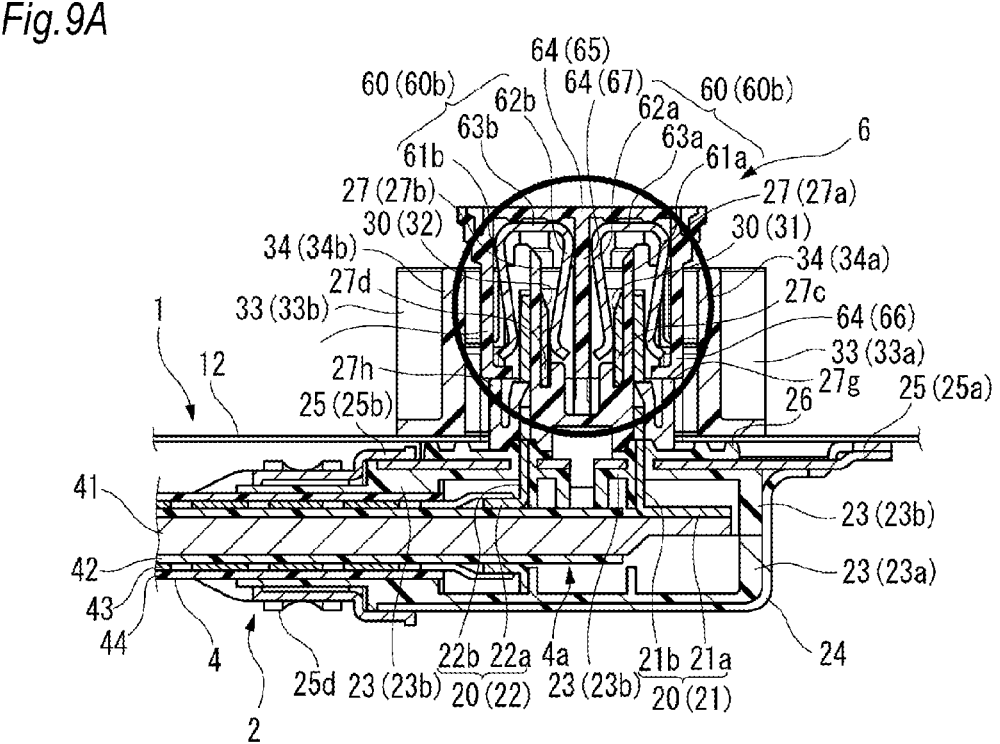
Figure 9B:
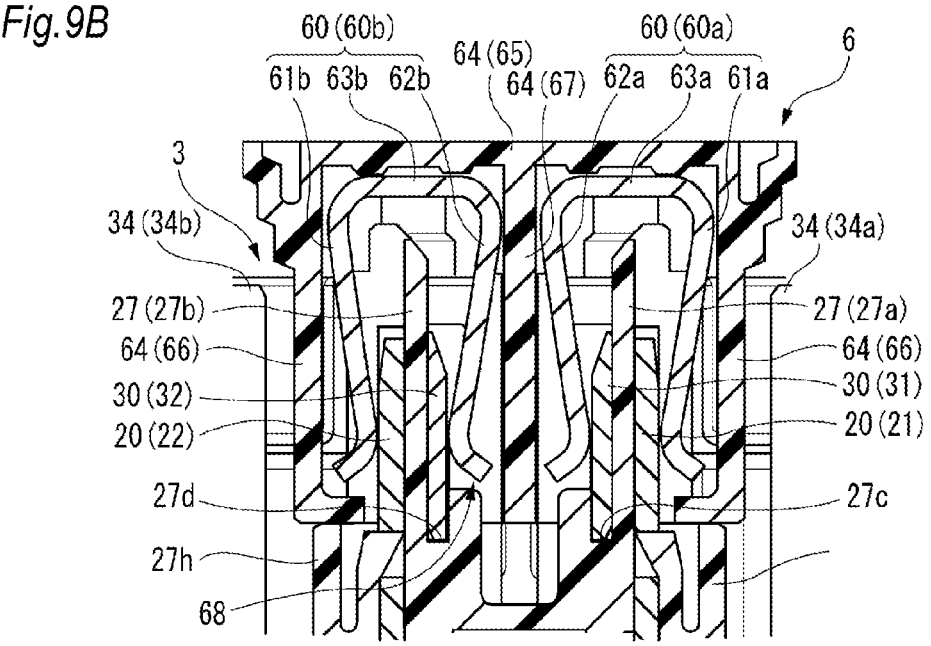

Additionally, the second connector housing 33 has the opening portion 35 from which the first terminal portion 20 and the second terminal portion 30 are exposed to an exterior thereof in such a state that the first connector 2 and the second connector 3 are fitted together, that is, the opening portion 35 from which the first terminal portion 20 and the second terminal portion 30 are looked in at. As shown in FIGS. 8 to 9B, the contact member (hereinafter, referred to as the contact securing plug) 6 is detachably installed in the opening portion 35 in such a way as to be brought into contact with the first terminal portion 20 and the second terminal portion 30 for establishing an electrical connection between the first terminal portion 20 and the second terminal portion 30. FIG. 8 is a perspective view, partially vertically sectioned along the front-to-rear direction, showing a state resulting after the contact securing plug 6 is fitted in the opening portion 35. FIGS. 9A and 9B are views showing the state resulting after the contact securing plug 6 is fitted in the opening portion 35, of which FIG. 9A is a vertical sectional view as seen from a direction indicated by an arrow A8 in FIG. 8, and FIG. 9B is an enlarged view of an encircled portion in FIG. 9A.

The contact securing plug 6 includes terminal contact portions 60 which are brought into contact with the first terminal portion 20 and the second terminal portion 30 to provide an electrical conducting state between the two terminal portions and the holder portion 64 which holds the terminal contact portions 60. The terminal contact portions 60 each include a first flexible arm portion 61 which is brought into contact with the first terminal portion 20 and a second flexible arm portion 62 which is brought into contact with the second terminal portion 30. When an electrical conducting state is provided between the first terminal portion 20 and the second terminal portion 30, the terminal contact portions 60 hold the first terminal portion 20 and the second terminal portion 30 by the first flexible arm portions 61 and the second flexible arm portions 62 therebetween which are elastically deflected to be deformed so that the first terminal portion 20 and the second terminal portion 30 are electrically connected together. With the contact securing plug 6 installed in the opening portion 35, the opening portion 35 is sealed off by the contact securing plug 6. Consequently, the contact securing plug 6 also has a function to electrically isolate the first terminal portion 20 and the second terminal portion 30 which stand opposite in such a state that the first connector 2 and the second connector 3 are fitted together from the exterior.

The terminal contact portion 60 is formed by curving a metallic sheet material having electric conductivity through punching or bending the metallic sheet material, and two opposite portions extend in the same direction from a curved portion (hereinafter, referred to as a connecting portion 63). One of the two opposite portion is referred to as the first flexible arm portion 61 (61a, 61b in the figure), and the other is referred to as the second flexible arm portion 62 (62a, 62b in the figure). The first flexible arm portion 61 and the second flexible arm portion 62 are made into a bent construction (a so-called spring construction) in which the first flexible arm portion 61 and the second flexible arm portion 62 extend from the connecting portion 63 (63a, 63b in the figure) while being inclined so as to gradually move toward each other and then extend while being inclined so as to gradually move away from each other until extending ends thereof. Namely, the first flexible arm portion 61 and the second flexible arm portion 62 can be elastically deflected to be deformed in the direction in which they move away from each other and can also be elastically deflected to be deformed in a direction in which they move toward each other. A distance by which the first flexible arm portion 61 and the second flexible arm portion 62 stand opposite is set to be smaller than a distance by which the first terminal portion 20 and the second terminal portion 30 stand opposite, that is, a distance defined between outer surfaces of the first terminal distal end portions 21b, 21b of the first terminal constituent members 21, 22 and inner surfaces of the second terminal constituent members 31, 32.

In this embodiment, the contact securing plug 6 includes the two terminal contact portions 60 (60a, 60b) which are held together by the single holder portion 64. In this case, the terminal contact portion 60a has the first flexible arm portion 61a which is brought into contact with the first terminal distal end portion 21b of the first terminal constituent member 21 and the second flexible arm portion 62a which is brought into contact with the second terminal constituent member 31, and these two flexible arm portions are connected to each other by the connecting portion 63a. In contrast with this, the other terminal contact portion 60b has the first flexible arm portion 61b which is brought into contact with the first terminal distal end portion 22b of the first terminal constituent member 22 and the second flexible arm portion 62b which is brought into contact with the second terminal constituent member 32, and these two flexible arm portions are connected to each other by the connecting portion 63b.

The holder portion 64 is a member which holds the first flexible arm portion 61 and the second flexible arm portion 62 so that the first and second flexible arm portions can electrically be isolated from the exterior by covering an outer edge of the terminal contact portion 60 from the side of the connecting portion 63. Because of this, the holder portion 64 is formed of an insulation material (for example, a resin material such as polyethylene, vinyl chloride, silicon or the like). In the holder portion 64, the two terminal contact portions 60a, 60b are disposed to be aligned side by side in the front-to-rear direction, and these terminal contact portions 60a, 60b are spaced apart from each other in a non-contact condition. According to this configuration, in the holder portion 64, the two terminal contact portions 60a, 60b are disposed side by side while being electrically isolated from each other. As this occurs, the two terminal contact portions 60a, 60b are disposed side by side so that the second flexible arm portions 62a, 62b are positioned inwards and the first flexible arm portions 61a, 61b are positioned outwards.

The holder portion 64 has a top portion 65 which holds the connecting portions 63a, 63b and covers upper portions of the connecting portions 63a, 63b, outer wall portions 66 which cover outer sides of the first flexible arm portions 61a, 61b and a partitioning portion 67 which is interposed between the second flexible arm portions 62a, 62b. As this occurs, the top portion 65 extends so as to cover the upper portions of the connecting portions 63a, 63b. The outer wall portions 66 continue to both end portions of the top portion 65 in the front-to-rear direction, are bent substantially perpendicularly downwards in the top-to-bottom direction from the portions where the outer wall portions 66 continue to the end portions and extend in pairs so as to cover the outer sides of the first flexible arm portions 61a, 61b. The partitioning portion 67 continues substantially to a middle portion of the top portion 65 in the front-to-rear direction, is bent substantially perpendicularly downwards in the top-to-bottom direction from the middle portion, and extends so as to isolate the second flexible arm portions 62a, 62b from each other. As this occurs, the outer wall portions 66 which are paired with each other are disposed so as to stand opposite by a distance which is shorter than a distance by which the second connector housing constituent members 33a, 33b stand opposite. Specifically, the pair of outer wall portions 66 are disposed so as to stand opposite so that a distance defined between outer surfaces of the outer wall portions 66 is set to be shorter than a distance defined between inner surfaces of the second connector housing constituent members 33a, 33b which stand opposite.

Additionally, the holder portion 64 has an opening portion (hereinafter, referred to as an installation opening) 68 which allows an opposite side to the top portion 65 in relation to the top-to-bottom direction, in other words, extending end sides of the outer wall portions 66 and the partitioning portion 67 to open to the exterior. Namely, the contact securing plug 6 is configured so that the first flexible arm portion 61 and the second flexible arm portion 62 of the terminal contact portions 60 (specifically speaking, extending ends of these arm portions) are exposed to the exterior from the installation opening 68. This enables the contact securing plug 6 to be installed in the opening portion 35 from the side of the installation opening 68.

Here, an example of a procedure of installing the contact securing plug 6 in the opening portion 35 will be described. In the case of the contact securing plug 6 being installed in the opening portion 35, the first connector 2 and the second connector 3 are assembled to the opening 11 in the floor panel 1 from both the sides thereof and are fitted together. As this occurs, firstly, the contact securing plug 6 is positioned on an upper side of the second connector 3 (above the second connector 3 in the top-to-bottom direction) so that the installation opening 68 is positioned square to the opening portion 35 (a state shown in FIG. 7A).

A predetermined force (hereinafter, referred to as a pressure) is exerted towards the lower side (downwards in the top-to-bottom direction) on the contact securing plug 6 while the connector fitting portion constituent members 27a, 27b of the connector fitting portion 27 are led to be interposed between the first flexible arm portions 61 and the second flexible arm portions 62. The pressure continues to be exerted on the contact securing plug 6 in that state, and the first flexible arm portions 61 are brought into abutment with the first terminal portion 20, while the second flexible arm portions 62 are brought into abutment with the second terminal portion 30. When the pressure is exerted on the contact securing plug 6 in this state, the first flexible arm portions 61 and the second flexible arm portions 62 slide along the first terminal portion 20 and the second terminal portion 30 while the first flexible arm portions 61 and the second flexible arm portions 62 are being elastically deflected to be deformed in directions in which the first flexible arm portions 61 and the second flexible arm portions 62 move away from each other. Then, the pressure is kept exerted on the contact securing plug 6 until the outer wall portions 66 of the holder portion 64 are brought into abutment with the corresponding resting seat portions 27g, 27h of the connector fitting portion 27, and the contact securing plug 6 is then forced into the opening portion 35. When the pressure exerted on the contact securing plug 6 is released after the contact securing plug 6 has been forced into the opening portion 35, the first flexible arm portions 61 and the second flexible arm portions 62 are elastically deflected to be deformed in restoring directions in which the first flexible arm portions 61 and the second flexible arm portions 62 move towards each other to thereby hold the first terminal portion 20 and the second terminal portion 30 therebetween with their elastic forces. In this state, the first flexible arm portions 61 can be brought into contact with the first terminal portion 20, and the second flexible arm portions 62 can be brought into contact with the second terminal portion 30. As a result of this, an electrical connection can be provided between the first terminal portion 20 and the second terminal portion 30 via the terminal contact portions 60. Namely, the electric motor and the power supply unit are connected together via the first connector 2 and the second connector 3, thereby making it possible to provide an electrical conducting state between the electric motor and the power supply unit.

Then, the contact securing plug 6 can be pulled out of the opening portion 35 by exerting a predetermined force (pulling force) towards the upper side (upwards in the top-to-bottom direction) on the contact securing plug 6. In this way, the first flexible arm portions 61 which are in contact with the first terminal portion 20 and the second flexible arm portions 62 which are in contact with the second terminal portion 30 can be removed therefrom, whereby the electrical conducting state present between the first terminal portion 20 and the second terminal portion 30 can be shut off.

In this way, when the contact securing plug 6 is installed in the opening portion 35, allowing the terminal contact portions 60 to be brought into contact with the first terminal portion 20 and the second terminal portion 30, the electrical conducting state can be provided between the first terminal portion 20 and the second terminal portion 30. On the other hand, when the contact securing plug 6 is pulled out of (removed from) the opening portion 35, the electrical conducting state provided between the first terminal portion 20 and the second terminal portion 30 which are in contact with each other via the terminal contact portions 60 can be shut off. Namely, the contact securing plug 6 can function as a so-called service plug (a circuit opening/closing device) which switches arbitrarily the electric circuit between the electric motor and the power supply unit between the electric conducting state and the shut off state.

Thus, according to the connector structure of the invention, the electric motor can easily be connected to the power supply unit by fitting the first connector 2 and the second connector 3 together and causing the contact securing plug 6 to be installed in the opening portion 35. This can realize an improvement in efficiency of the electrical connecting work of connecting the electric motor and the power supply unit together by using the electric wire which is passed through the opening 11 in the floor panel 1.

The electric conducting state provided between the first terminal portion 20 and the second terminal portion 30 can be shut off by pulling (removing) the contact securing plug 6 out of (from) the opening portion 35. This enables the electric circuit between the electric motor and the power supply unit to be shut off easily in providing a mechanical inspection or maintenance of a vehicle or performing rescue work, whereby the safety of a working person can be ensured. In this way, since the contact securing plug 6 can be made to function as the so-called service plug (the circuit opening/closing device), no service plug is necessary to be provided separately in the electrical joint box or the power supply unit. Consequently, it is possible to realize a reduction in the number of parts involved.

Here, the characteristics of the embodiment of the connector structure according to the invention will be summarized briefly under [1] to [2] below.

[1] The connector structure in which the pair of connectors (2, 3) are assembled to the opening (11) which penetrates the floor panel (1) in the passenger compartment from both the sides of the floor panel and the terminal portions (20, 30) which are provided individually in the connectors which are fitted together are electrically connected, including:

the first connector (2) including the first terminal portion (20) which is led through the opening in the floor panel to project into the passenger compartment;

the second connector (3) including the second terminal portion (30) which is positioned opposite to the first terminal portion with the second connector fitted to the first connector across the floor panel and the opening portion (35) through which the first terminal portion and the second terminal portion are exposed to the exterior; and the contact member (the contact securing plug 6) which is detachably installed in the opening portion to be brought into contact with the first terminal portion and the second terminal portion for establishing an electric connection between the first terminal portion and the second terminal portion.

[2] The contact member includes the first flexible arm portion (61) which is brought into contact with the first terminal portion and the second flexible arm portion (62) which is brought into contact with the second terminal portion, and when elastically deflected to be deformed, the first flexible arm portion and the second flexible arm portion hold the first terminal portion and the second terminal portion therebetween.

While the invention has been described in detail and by reference to the embodiment, it is obvious to those skilled in the art to which the invention pertains that various modifications can be made thereto without departing from the spirit and scope of the invention.

This application is based on the Japanese Patent Application (No. 2012-246797) filed on Nov. 8, 2012, the contents of which are incorporated herein by reference.

INDUSTRIAL APPLICABILITY

According to the connector structure of the invention, it is possible to realize an improvement in efficiency and safety of electrical connection work for pieces of electrical equipment via a through hole opened in a floor panel, while realizing a reduction in the number of parts involved. The invention which can provide this advantage is useful for the connector structure which connects pieces of electrical equipment mounted in a vehicle such as a motor vehicle and is particularly useful in the field of connector structures which are used to electrically connect an electric motor and a power supply unit together via a through hole opened in a floor panel.

DESCRIPTION OF REFERENCE NUMERALS 1 floor panel
2 first connector
3 second connector
6 contact member (contact securing plug)
11 opening
20 first terminal portion
30 second terminal portion
35 opening portion

The invention claimed is:

1. A connector structure in which a pair of connectors are assembled to an opening which penetrates a floor panel in a passenger compartment from both sides of the floor panel, and terminal portions which are provided individually in the connectors which are fitted together are electrically connected, the connector structure comprising:

a first connector including a first terminal portion which is led through the opening in the floor panel to project into the passenger compartment;

a second connector including a second terminal portion which is positioned opposite to the first terminal portion in a state that the second connector is fitted to the first connector across the floor panel, and an opening portion through which the first terminal portion and the second terminal portion are exposed to an exterior; and a contact member which is detachably installed in the opening portion to be brought into contact with the first terminal portion and the second terminal portion for establishing an electric connection between the first terminal portion and the second terminal portion.

2. The connector structure according to claim 1, wherein the contact member includes a first flexible arm portion which is brought into contact with the first terminal portion, and a second flexible arm portion which is brought into contact with the second terminal portion, and the first flexible arm portion and the second flexible arm portion, which are elastically deflected to be deformed, hold the first terminal portion and the second terminal portion therebetween.

* * * * *